(12) United States Patent
Manukyan et al.

(10) Patent No.: US 9,110,284 B2
(45) Date of Patent: Aug. 18, 2015

(54) ELECTROWETTING ELEMENT

(71) Applicant: Amazon Technologies, Inc., Seattle, WA (US)

(72) Inventors: Gor Manukyan, Veldhoven (NL); Bokke Johannes Feenstra, Nuenen (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/036,837

(22) Filed: Sep. 25, 2013

(65) Prior Publication Data

US 2015/0085342 A1    Mar. 26, 2015

(51) Int. Cl.
*G02B 26/00* (2006.01)

(52) U.S. Cl.
CPC ............ *G02B 26/005* (2013.01); *G02B 26/004* (2013.01)

(58) Field of Classification Search
USPC ................................................ 359/290–295
See application file for complete search history.

(56) References Cited

U.S. PATENT DOCUMENTS

| | | | |
|---|---|---|---|
| 2009/0027317 A1 | 1/2009 | Cheng et al. | |
| 2009/0284824 A1* | 11/2009 | Feenstra et al. | 359/291 |
| 2009/0316253 A1* | 12/2009 | Fairley et al. | 359/292 |
| 2010/0220380 A1* | 9/2010 | Hayes et al. | 359/290 |
| 2013/0222355 A1 | 8/2013 | Choi et al. | |

FOREIGN PATENT DOCUMENTS

| | | |
|---|---|---|
| WO | 2006090317 A1 | 8/2006 |
| WO | 2008142086 A1 | 11/2008 |
| WO | 2009071694 A2 | 6/2009 |

OTHER PUBLICATIONS

Chiu, Yung-Hsiang et al., "Accurate-gray-level and quick-response driving methods for high-performance electrowetting displays," Journal of the Society for Information Display, vol. 19, Issue 11, pp. 741-748, Nov. 2011.

* cited by examiner

*Primary Examiner* — Mohammed Hasan
(74) *Attorney, Agent, or Firm* — BainwoodHuang

(57) ABSTRACT

An electrowetting element comprising: a first fluid and a second fluid immiscible with the first fluid; and a surface. The first and second fluids are switchable to a first configuration by application of a voltage, the first fluid adjoining a first area of the surface and the second fluid adjoining a second area of the surface in the first configuration. The electrowetting element includes at least one reconfiguration reducer for reducing a reconfiguration of the first and second fluids from the first configuration to a second configuration. The second configuration has the first fluid adjoining the second area and the second fluid adjoining the first area, there being a tendency for said reconfiguration to occur when maintaining said applied voltage.

23 Claims, 3 Drawing Sheets

ELECTROWETTING ELEMENT

BACKGROUND

Electrowetting display devices are known. In an off state of a picture element of such a device an oil covers a display area. In an on state the oil is retracted so as to cover less of the display area. To switch the picture element to the on state a voltage is applied via an electrically conductive fluid immiscible with the oil. To switch the picture element to the off state, the voltage is switched off. In examples where the oil is coloured, a radiation beam passing through the picture element when in the off state passes through the oil and is imparted with colour. However, when the picture element is in the on state, the beam does not pass through the oil meaning its colour remains substantially unchanged.

It is desirable to provide an improved electrowetting element.

DETAILED DESCRIPTION

Figure 1:
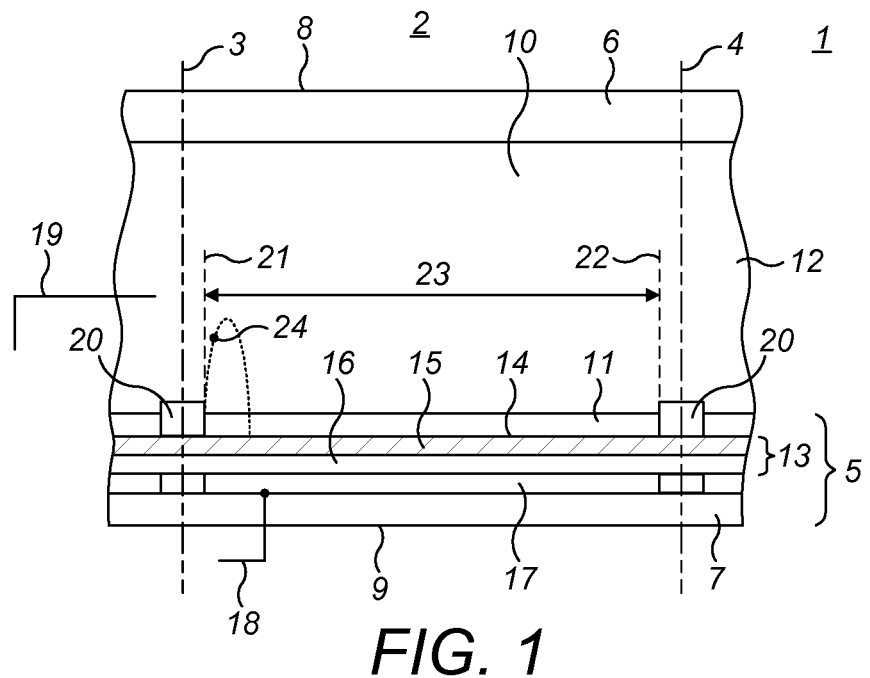
FIG. 1 shows schematically a known electrowetting element.

FIG. 1 shows a diagrammatic cross-section of part of a known electrowetting device. In this example the device is an electrowetting display device 1 including a plurality of electrowetting elements, which are picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 6, 7 and may be rigid or flexible.

The display device has a viewing side 8 on which an image or display formed by the display device can be viewed and a rear side 9. In the Figure the first support plate 5 defines the rear side 9 and the second support plate 6 defines the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display device, a direct drive display device or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12 at least one of which may be a liquid. The second fluid is immiscible with the first fluid. The second fluid is electrically conductive or polar and may be water or a salt solution such as a solution of potassium chloride in water. The second fluid may be transparent, but may be coloured, white, absorbing or reflecting. The first fluid is electrically non-conductive and may for instance be an alkane like hexadecane or may be an oil such as silicone oil.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum, or reflecting. A reflective layer may reflect the entire visible spectrum, making the layer appear white, or part of it, making it have a colour.

The support plate 5 includes an insulating layer 13. The insulating layer may be transparent or reflective. The insulating layer 13 may extend between walls of a picture element. To avoid short circuits between the second fluid 12 and electrodes arranged under the insulating layer, layers of the insulating layer may extend uninterrupted over a plurality of picture elements 2, as shown in the Figure. The insulating layer has a surface 14 facing the space 10 of the picture element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon®AF1600. The barrier layer 16 may have a thickness, taken in a direction perpendicular the plane of the substrate, between 100 nanometers and 150 nanometers and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each element 2 includes an electrode 17 as part of the support plate 5. In examples shown there is one such electrode 17 per element. The electrode 17 is separated from the fluids by the insulating layer 13; electrodes of neighbouring picture elements are separated by a non-conducting layer. In some examples, further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display driving system. In a display device having the picture elements arranged in a matrix form, the electrodes can be coupled to a matrix of control lines on the substrate 7. The electrodes described herein for each picture element together form a configuration of electrodes for applying the voltage in at least one of the picture elements. The display driving system may include a voltage controller configured to control the applying of the voltage to the configuration of electrodes.

The first fluid 11 in this example is confined to one picture element by one or more walls, in this example four walls 20, that follow the cross-section of the picture element. The cross-section of a picture element may have any shape; when the picture elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the picture element, indicated by the dashed lines 3 and 4, is defined by the centre of the walls 20. The area between the walls of a picture element, indicated by the dashed lines 21 and 22, is called the display area 23, over which a display effect occurs.

Figure 2:
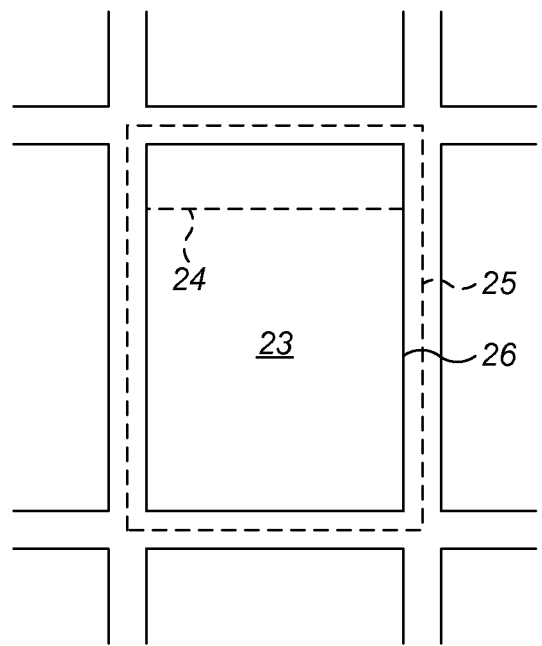
FIG. 2 shows a plan view of the known electrowetting element.

FIG. 2 shows a matrix of rectangular picture elements in a plan view of the hydrophobic layer of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23.

When no voltage is applied between the electrodes, the first fluid 11 forms a layer between the walls 20, as shown in FIG. 1. Application of a voltage will contract the first fluid, for example against a wall as shown by the dashed shape 24 in FIG. 1. The controllable shape of the first fluid, in dependence on the magnitude of applied voltage, is used to operate the picture element as a light valve, providing a display effect over the display area 23.

A new problem has now been realised. It has been found that when applying the voltage to at least one of the first and second fluids, as described above, the first and second fluids adopt a first configuration and that, when in the first configuration and when maintaining the applied voltage for switching the first and second fluids to the first configuration, there is a tendency for the first and second fluids to reconfigure to adopt a second configuration, different from the first configuration. In the first configuration the first fluid adjoins a first area of the surface and the second fluid adjoins a second area of the surface. In the second configuration the second fluid adjoins the first area and the first fluid adjoins the second area. Having identified the new problem, it has been realised that an electrowetting element may be arranged to reduce the reconfiguration of the first and second fluids from the first configuration to the second configuration, for example by providing a reconfiguration reducer.

This will now be described in more detail with reference to FIGS. 3 to 5. Features illustrated in FIGS. 3a and 3b and referred to herein are similar to features described previously using FIGS. 1 and 2; such features will be referred to using the same reference numerals, incremented by 100; corresponding descriptions should be taken to apply also.

Figure 3A:
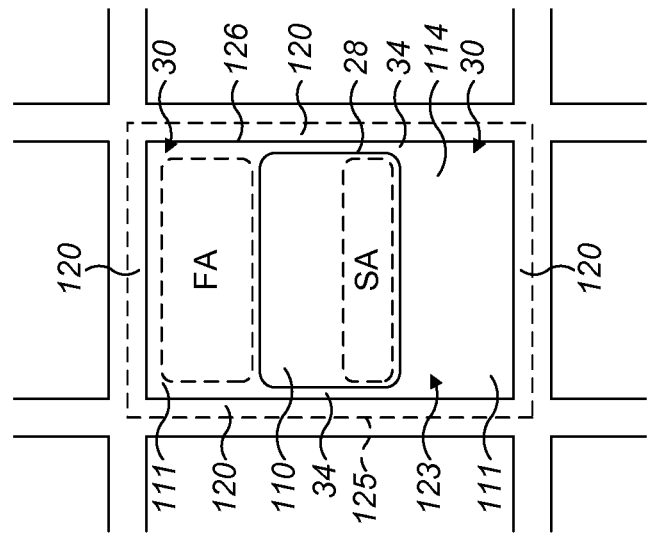
FIGS. 3a and 3b show schematically a problem with the known electrowetting element.
Figure 3B:
Figure 3B:
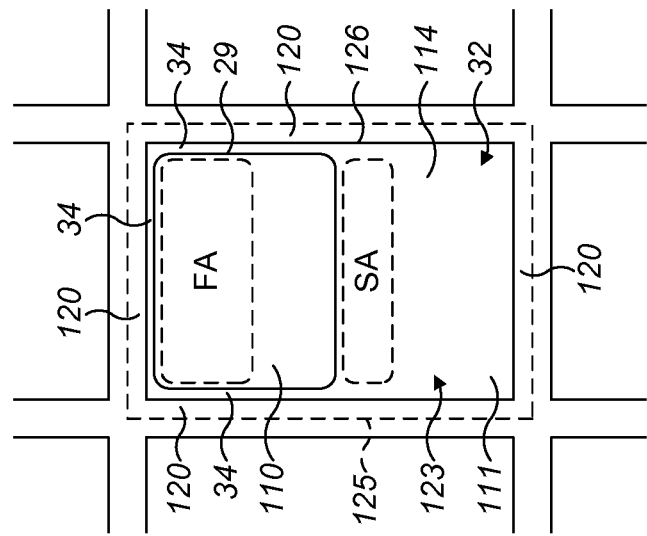

FIGS. 3a and 3b show schematically a plan view of the hydrophobic layer of a matrix of rectangular picture elements according to an example. FIG. 3a shows an example of the first configuration of the first and second fluids and FIG. 3b shows an example of the second configuration of the first and second fluids.

The first configuration is adopted for example when starting from the state when no voltage is applied, i.e. an off state, where the first fluid forms the layer between the walls 120, with the first fluid adjoining the entire surface, as shown by FIG. 1. Upon applying an appropriate magnitude of voltage, the first and second fluids switch to the first configuration; in doing so, the first fluid splits. The likelihood of the first fluid splitting in this manner depends on factors including an aspect ratio of the electrowetting element (described later), a thickness of the first fluid in the off state, the curvature of the interface between the first and second fluid when no voltage is applied and the presence of dust or manufacturing defects in the electrowetting element. As FIG. 3a shows, the first fluid is contracted from part of the surface and forms a plurality of contracted portions. In this example, the first configuration includes two contracted portions 30 of the first fluid, each comprising at least 35% by volume, for example 40%, 45% or 48% by volume, of the first fluid and in this example being positioned to oppose each other, in this example with one of the contracted portions being located adjacent one side of the display area 123 and the other contracted portion being located adjacent an opposite side of the display area. Each contracted portion adopts a contracted form similar to the dashed shape 24 illustrated in FIG. 1.

Referring now to FIG. 3b, there is illustrated an example of the second configuration. In this example the first fluid is contracted from part of the surface and forms fewer contracted portions than in the first configuration. In other examples, the number of contracted portions may be the same as the first configuration. In this example, the first fluid forms one contracted portion 32 comprising at least 70% by volume, for example 80%, 90% or 96% by volume of the first fluid. The contracted portion in this example is located adjacent one side of the display area 123. The contracted portion adopts a contracted form similar to the dashed shape 24 illustrated in FIG. 1.

Referring to FIGS. 3a and 3b, a display effect of the picture element is provided over the display area 123 in dependence on an extent of adjoinment of the first and second fluids with the surface 114, in particular the surface of the display area 123. In the first configuration, the extent of the display area 123 adjoined by the first fluid is defined herein as the first region of the display area and the extent of the display area 123 adjoined by the second fluid is defined herein as the second region of the display area. The first and second regions together form the display area. A boundary between the first and second regions is illustrated by lines 28, 29 in FIGS. 3a, 3b, respectively.

With the fluids being in one configuration, the first and second regions do not overlap. However, when comparing different fluid configurations, such as the first configuration and the second configuration, the first region and/or the second region in the first configuration may partially overlap respectively with the first region and/or the second region in the second configuration. The first region and the second region are different in extent, i.e. size, and/or location for the first configuration and for the second configuration. In the present example, the second region is larger for the second configuration than for the first configuration.

In the first configuration, the first region includes the first area FA and the second region includes the second area SA. The first area FA and the second area SA are shown with dashed lines. The extent of the first area FA may be different from the extent of the second area SA; in FIGS. 3a and 3b the first area FA is larger than the second area SA. The extent of the first area is however the same for both the first and second configurations, as is the extent of the second area for both the first and second configurations. The first area FA and the second area SA each define any extent of the display area provided that in the first configuration the first fluid adjoins the first area and the second fluid adjoins the second area while in the second configuration the first fluid adjoins the second area and the second fluid adjoins the first area.

Thus, when the fluids reconfigure from the first to the second configuration, first fluid adjoining the first area FA is substituted with second fluid and second fluid adjoining the second area SA is substituted with first fluid. This differs from a known problem of backflow in an electrowetting element, where there is a tendency of an oil for example to flow back to cover a display area, despite applying a voltage to maintain the oil in a contracted form; during backflow, an electroconductive or polar fluid does not substitute the oil in adjoining a display area.

The tendency for the first and second fluids to reconfigure from the first configuration to the second configuration is problematic. Firstly, the reconfiguring can cause a change in a display effect provided by the picture element. This is because the extent of the first region can be different from the extent of the second region, as illustrated by the boundaries labelled 28, 29. The display effect may therefore differ in brightness and the greyscale level provided, between the first and second configurations. In the present example, this is due to more light being transmitted by the picture element when in the second configuration compared with the first configuration, due to the larger second region. Further, the change of configuration may give a flicker effect and can reduce the quality of an image. Moreover, the reconfiguring occurs whilst seeking to provide a constant display effect, meaning that a changing display effect is provided instead. Also, for a display device comprising a plurality of picture elements, the first and second configurations may differ between different picture elements and the reconfiguring may take a longer or shorter duration; as a consequence, any flicker effect and difference in brightness and greyscale level may differ for different picture elements, which detracts further from the quality of a displayed image. Furthermore, when switching the first and second fluids to a configuration where no voltage is applied, i.e. an off state where the first fluid forms a layer across the surface as described above, the time for the first and second fluids to adopt the off state configuration, which may be referred to as a closing time of the first fluid, may be different in the second configuration than in the first configuration. This is because in the second configuration the one contracted portion of the first fluid has a greater distance to flow across the surface to cover the surface, compared with the two contracted portions of the first fluid in the first configuration which on closing meet in the centre of the display area. Further, as the two contracted portions begin to meet in the centre of the display area, on closing, the front of each closing first fluid portion meet and begin to join; this joining accelerates the closing of the element and thus decreases the closing time, compared with closing from the second configuration. For example, the closing time from the first configuration may take approximately 20 milliseconds compared with approximately 90 milliseconds from the second configuration.

In identifying the problem of fluid reconfiguration, a cause of the problem has been realised. Without being bound to any theory, it is believed that the reconfiguring of the first and second fluids from the first to the second configuration, whilst maintaining the applied voltage, is due at least in part to flow of the first fluid along a join between the wall 120 and the surface 114. As the first configuration is energetically unstable compared with the second configuration, it is energetically favourable for the first fluid to flow to adopt the second configuration. In particular, it is believed that the flow along the join is due to capillary action, caused by at least one of the following: wettability properties of the surface of the walls 120 and/or of the surface 114 to the first and second fluids, the surface tension properties of the first and second fluids, the geometry of the join including the angle at which the side of the wall 120 touches the surface 114, the magnitude of the voltage applied and how fast this voltage has been applied.

As shown in FIGS. 3a and 3b, a small volume 34 of the first fluid, compared with the volume of first fluid in the contracted portions 30, 32 may adjoin the walls at a location on the surface not occupied by the contracted portions 30, 32. This is believed to be due to the capillary action. By flow of the first fluid along the walls, the first and second fluids can reconfigure from the first to the second configuration in for example 1 second.

It has been realised that the problem of fluid reconfiguration may be reduced, or eliminated, by arranging an electrowetting element to reduce the reconfiguration of the first and second fluids from the first configuration to the second configuration. In some examples to be described, an electrowetting element is provided with at least one reconfiguration reducer for reducing the reconfiguration of the first and second fluids from the first configuration to the second configuration.

It may be considered counterintuitive to reduce the fluid reconfiguration, as this would seek to maintain the first and second fluids in the less energetically favourable first configuration. Moreover, the first fluid in the first configuration is split into two contracted portions, if not more; it is generally preferred in the art for the first fluid to be contracted as one portion to one side of the display area as illustrated by dashed shape 24 in FIG. 1.

In an example, the reconfiguration reducer may be a barrier configured to reduce the flow of the first fluid from one location on the surface 114 to another location on the surface 114, for example from one contracted portion 30 in the first configuration illustrated in FIG. 3a to the opposite contracted portion 30.

In further examples, the reconfiguration reducer may comprise a barrier configured to reduce a flow of the first fluid along the wall 120 from one location on the wall, such as adjacent one contracted portion 30, to another location on the wall, such as adjacent the opposite contracted portion 30. The barrier may therefore be provided at the join between the wall and the surface, to block or reduce flow of the first fluid along the wall, at the join, by for example breaking a capillary flow of first fluid along the wall and the surface 114. In doing so, this substantially maintains the first configuration despite it being less energetically stable than the second configuration, thus reducing or preventing reconfiguring of the first and second fluids to the second configuration. Substantially maintains means that reconfiguration is sufficiently reduced to maintain the first configuration for a duration suitable for the display requirements of the picture element. The location of the reconfiguration reducer along the join may be selected appropriately so the first configuration is substantially maintained.

The reconfiguration reducer may be a separate element placed at the join between the wall and the surface, to block or reduce the capillary flow of the first fluid; such an element may for example be formed of Teflon® AF1600. Alternatively, the reconfiguration reducer may be a protrusion of the wall, i.e. formed as part of the wall. Such an example is illustrated schematically with FIG. 4 which shows a plan view similar to that of FIGS. 3a and 3b.

Figure 4:
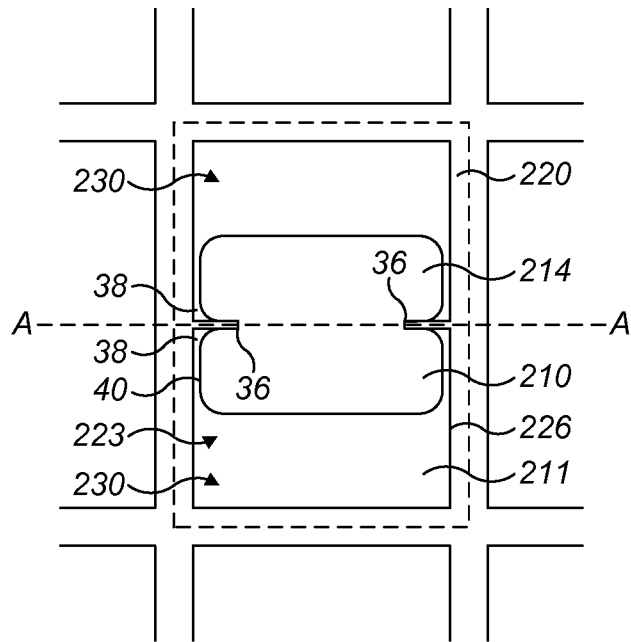
FIG. 4 shows a plan view of an example of an electrowetting element.
Figure 5:
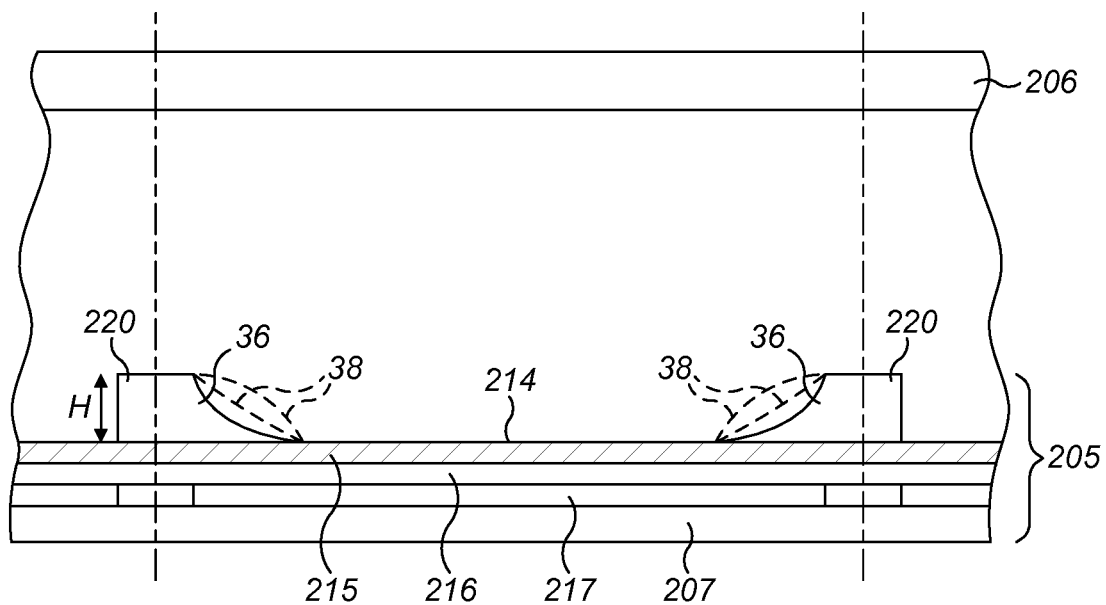
FIG. 5 shows another view of the example of the electrowetting element.

Features are illustrated in FIG. 4 which are similar to those described previously; such features are referred to using the same reference numerals, incremented by 200; corresponding descriptions should be taken here also.

FIG. 4 shows as an example two reconfiguration reducers 36, each being a protrusion of the walls 220. Each protrusion is formed as a part of the walls and therefore of the same material as the walls, such as SU8. Such walls may be formed using a photolithography technique as is well known in the art.

As shown in FIG. 4, the first fluid may adjoin the walls not occupied by the contracted portions 230. This includes the first fluid adjoining the protrusions to some extent and may include collecting a part of the first fluid at the protrusion, as shown by label 38, due to blocking of the first fluid capillary flow along the wall by the protrusion. The boundary between the first and second regions of the display area is labelled 40.

The reconfiguration reducer may have dimensions and/or a shape to reduce or prevent the reconfiguring from the first configuration to the second configuration, by for example functioning to break, restrict or block, the capillary flow of the first fluid. FIG. 5 shows the example picture element of FIG. 4 in cross section along dashed line A- -A. Each protrusion 36 in this example has a concave profile, with a decreasing height H as the protrusion protrudes further into the centre of the picture element. However, the protrusion may instead have a triangular or convex profile as illustrated by dashed lines 38. Moreover, each protrusion has a rectangular footprint as shown in FIG. 4. However, in other examples, the protrusion, i.e. the reconfiguration reducer, may be formed with a differently shaped footprint. The profile and the extent and shape of the footprint is selected to provide the function of reducing or preventing fluid reconfiguration from the first to second configurations. It is noted that one or a plurality of the reconfiguration reducers need not extend across the picture element from one side of the display area to an opposite side of the display area, in order that first fluid from one contracted portion can flow across the surface to meet first fluid flowing from the opposite contracted portion, without meeting a barrier across the picture element.

The examples of the reconfiguration reducer described so far provide a barrier, i.e. a mechanical obstruction, to first fluid flow. The reconfiguration reducer may also use wettability properties to assist in reducing the fluid reconfiguration. For example, the reconfiguration reducer may be formed of a material with a lower wettability to the first fluid, i.e. a greater wettability to the second fluid, than the wall material; thus the second fluid prefers to adjoin the reconfiguration reducer more than the first fluid and the first fluid prefers to adjoin the wall more than the second fluid, thus assisting breaking of the capillary flow along the wall. In such examples, where the reducer is a protrusion as described previously, the protrusion may be lower in height than a wall height, since the wettability property assists to reduce the fluid reconfiguration. In some examples, the walls may therefore be a thin layer of a material less wettable to the first fluid than the surface 214, for example a hydrophilic material. In some examples, where the walls are a surface layer which repels the first fluid, as explained above, the reducer may be a protrusion of such a wall and formed of the wall material.

A wettability property of the reconfiguration reducer may further be used to assist initiation of fluid motion in the picture element. For example, the reconfiguration reducer may have a part such as a surface with a wettability to the second fluid which is greater than a wettability of the surface 214 to the second fluid and for example may be formed of SU8. Further, in such an example, the reconfiguration reducer, such as a barrier described previously, may be located in the picture element to define a location where motion of the first fluid initiates before motion of the first fluid initiates at a different location in the picture element, when applying a voltage to change the configuration of the first and second fluids from the configuration where no voltage is applied in the off state. The location of the reconfiguration reducer may be at a location along the join between the surface and at least one of the walls, the location being selected in accordance with where it is desired for initiation to first occur. The initiation may occur due to a thickness of the first fluid being thinner at the reconfiguration reducer, than on the surface 214, such that when applying a voltage, the electric field is stronger where the first fluid is thinnest and thus fluid initiation occurs at that location. The initiation may also occur due to the greater preference of the second fluid to wet the reducer, such that when a voltage is applied, the reconfiguration reducer will be the first place in the electrowetting element where the second fluid replaces the first fluid. Thus, in addition to reducing the fluid reconfiguration from the first to the second configuration, the reconfiguration reducer can determine an initiation location of fluid motion which is the same for consecutive switchings of the picture element from the off state to an on state where a voltage is applied. The form of the protrusion and/or the footprint may be selected to assist with the initiation location function.

The reconfiguration reducer may be located in the picture element to determine a position of the first and second fluids in the first configuration. For example, in the example described using FIGS. 4 and 5, there are provided two protrusions, opposite each other on the two longer sides of the display area. Those protrusions are each located on the join between the surface and at least one of the walls, in this example half-way along the corresponding side of the display area and therefore half-way along the join between the surface and the corresponding wall. Thus, they are located to define an initiation location defining a 50:50 split of the first fluid when applying a voltage with the element in the off state, thus yielding the first configuration described above with two opposing contracted portions of first fluid.

In some examples, the reconfiguration reducer may be located in the picture element to determine a duration of switching the first and second fluids from the first configuration to the configuration of the fluids in the off state with no voltage applied. The reconfiguration reducer may therefore be located at a location along the join between the surface and at least one of the walls, the location being selected in dependence on the desired switching duration. For example, in the example of FIGS. 4 and 5, the first fluid of each opposite contracted portion need only flow across half of the display area until meeting the first fluid of the other contracted portion, compared with the second configuration. Thus, a closing time may be shorter than for other examples where the reducer is located differently. This reduction of closing time may be useful in electrowetting elements with a larger display area defined by the walls, so that a suitably quick closing time may be obtained.

Where an electrowetting display device comprises a plurality of picture elements such as those described herein, at least one reconfiguration reducer may be located in one of the picture elements in substantially the same location relative to the location of the at least one reconfiguration reducer of another one of the plurality of picture elements. The term substantially here means within an accepted tolerance of error in manufacturing a matrix of picture elements. By locating each reconfiguration reducer in substantially the same location, for each picture element, for example, the configuration of the fluids in the first configuration and therefore the corresponding display effect, may be the same for each picture element. Moreover, the closing time may be the same for each picture element. Further, each picture element may initiate fluid motion at the same location, again contributing to consistent display effects across the display device.

The above examples are to be understood as illustrative. Further examples are envisaged.

For example, although a reconfiguration reducer has been referred to in the singular in some examples above, it is envisaged that in further examples an electrowetting element may comprise more than one reconfiguration reducer. One example has been given using FIGS. 4 and 5, where two reconfiguration reducers, in that example protrusions, are described. Further examples are envisaged with two or more reconfiguration reducers, which may be in accordance with examples described above and which are positioned appropriately to reduce or prevent reconfiguration of the fluids from the first to the second configuration. It is noted that in the example of FIGS. 4 and 5, the two reconfiguration reducers are located opposite each other, each being half-way along a longer side of the display area and therefore half-way along the join between the surface and the appropriate wall. In further examples, the two reconfiguration reducers may be located substantially half-way along the appropriate join, for example at a location between 40% to 60% along the length of the join; in such examples, the two reconfiguration reducers may be substantially opposite each other.

The first configuration of the fluids has been described with reference to FIG. 3a. In further examples, the first and second fluids may be differently arranged in the first configuration, for example with different proportions of first fluid in contracted portions of the first fluid, with different extents and locations of the first and second regions. In such examples, the first fluid may collect predominantly at more than two locations on the display area, possibly with an uneven distribution across the surface.

Further, it is noted that although in FIG. 3b the second configuration is illustrated with the contracted portion 32 at the lower part of the Figure, the first fluid may flow in the opposite direction from the first configuration to form the second configuration with the contracted portion 32 of first fluid at the upper part of the Figure; thus the barrier in examples described herein reduces or prevents capillary flow of the first fluid in either direction along the surface and/or the wall, for example along the join. In further examples, however, the reconfiguration reducer may reduce or prevent flow of the first fluid in one direction.

As explained above, providing of a reconfiguration reducer, such as a wall protrusion, may reduce a closing time of an electrowetting element. This effect of reducing the closing time may be useful in dependence on the aspect ratio of an electrowetting element. The aspect ratio may be defined as the ratio of the dimensions of the display area to the height of a wall confining the first fluid. For example, an electrowetting element may have a square display area with dimensions of 160 micrometers square and a wall height of 4 micrometers; this gives an aspect ratio of 40:1. For the same display area, but with a wall height of 2 micrometers, the aspect ratio is 80:1. For a square display area with dimensions of 320 micrometers square and a wall height of 4 micrometers, the aspect ratio is 80:1. It has been found that with a greater aspect ratio, for example 80:1 compared with 40:1, the electrowetting element tends to have a slower closing time. For a rectangular display area, the aspect ratio may be defined as the ratio of (L+S)/2 to the height of the wall, where L is the dimension of a long side of the display area and S is the dimension of a short side of the display area. For example, for a display area of 160×80 micrometers and a wall height of 4 micrometers, the aspect ratio is 30:1. By reducing fluid reconfiguration in accordance with examples herein, the closing time may be shortened.

Reducing the fluid reconfiguration according to examples described herein is also found to be useful for electrowetting elements with a thinner layer of first fluid when in the off state compared with those with a thicker first fluid layer. Such thinner first fluid layers may be used in a high resolution electrowetting display device, without changing the aspect ratio. However, with a thinner first fluid layer, there is a greater tendency for the first fluid to split and collect at different locations on the display area, when applying a voltage, such that the first configuration is more likely to occur; there is therefore a greater tendency for the first and second fluids to reconfigure to the second configuration.

Further examples are envisaged. For example, any of a surface tension of the first and/or second fluids, a wettability of the wall surface and a wettability of the display area surface, an angle of the join between a surface of the wall and the display area surface, may be selected to reduce the reconfiguration from the first to the second configurations, for example by breaking, reducing, restricting or preventing capillary flow of the first fluid along the wall. Further, one or both of the first and second fluids may include a compound with properties which for example determine a surface tension of the fluid, to reduce the occurrence of fluid reconfiguration. Further, the surface of the display area may, instead of being planar, be shaped to reduce flow of the first fluid or the second fluid to reduce the fluid reconfiguration from the first configuration to the second configuration; for example in further examples, instead of the barrier being formed as a wall protrusion, the barrier may be formed as part of the first support plate, for example as a protrusion of the hydrophobic layer, or it may be formed by an indentation in the wall or in the first support plate.

It is to be understood that any feature described in relation to any one example may be used alone or in combination with other features described and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
   a first fluid and a second fluid immiscible with the first fluid; and
   a surface,
   the first and second fluids being switchable to a first configuration by application of a voltage, the first fluid adjoining a first area of the surface and the second fluid adjoining a second area of the surface in the first configuration,
   the electrowetting element including at least one reconfiguration reducer for reducing a reconfiguration of the first and second fluids from the first configuration to a second configuration, wherein the second configuration has the first fluid adjoining the second area and the second fluid adjoining the first area.

2. An electrowetting element according to claim 1, wherein the at least one reconfiguration reducer is a barrier arranged to reduce a flow of the first fluid from one location on the surface to another location on the surface.

3. An electrowetting element according to claim 2, including a wall at least partly confining the first fluid, wherein the barrier is arranged to reduce a flow of the first fluid along the wall from one location on the wall to another location on the wall.

4. An electrowetting element according to claim 3, wherein the barrier is at least one of: a protrusion of the wall, a protrusion of the surface, an indentation of the wall, or an indentation of the surface.

5. An electrowetting element according to claim 2, including at least one wall defining a display area of the surface with a first side and a second side opposite the first side, wherein the barrier extends from the first side without extending across the display area to the second side.

6. An electrowetting element according to claim 1, wherein the surface has a wettability to the second fluid which is less than a wettability to the second fluid of at least part of the at least one reconfiguration reducer.

7. An electrowetting element according to claim 6, including at least one wall confining the first fluid, wherein the at least one reconfiguration reducer is located at a location along a join between the surface and the at least one wall, thereby defining a location where motion of the first fluid initiates before motion of the first fluid initiates at a different location in the electrowetting element upon applying a voltage to change the configuration of the first and second fluids from a configuration with no voltage applied.

8. An electrowetting element according to claim 1, including at least one wall confining the first fluid, the at least one reconfiguration reducer including a first reconfiguration reducer and a second reconfiguration reducer located on a join between the surface and the at least one wall, the first and second reconfiguration reducers substantially opposing each other.

9. An electrowetting element according to claim 8, wherein the at least one wall includes a first wall and a second wall opposite the first wall, wherein the first reconfiguration reducer is located substantially half-way along a join between the surface and the first wall and the second reconfiguration reducer is located substantially half-way along a join between the surface and the second wall.

10. An electrowetting element according to claim 1, the first fluid being contracted from part of the surface in the first and second configurations, wherein in the first configuration the first fluid forms a plurality of contracted portions, and in the second configuration the first fluid forms at most the same number of contracted portions compared with the first configuration.

11. An electrowetting element according to claim 10, wherein in the first configuration there are two contracted portions of the first fluid each comprising at least 35%, 40%, 45% or 48% by volume of the first fluid, and in the second configuration there is one contracted portion of the first fluid comprising at least 70%, 80%, 90% or 96%, by volume of the first fluid, respectively.

12. An electrowetting element according to claim 11, wherein in the first configuration the two contracted portions of the first fluid are positioned in the electrowetting element so as to oppose each other.

13. An electrowetting element according to claim 1, including at least one wall confining the first fluid, wherein the at least one reconfiguration reducer is located in the electrowetting element at a location along a join between the surface and the at least one wall, to substantially maintain a position of the first and second fluids in the first configuration.

14. An electrowetting element according to claim 1, including at least one wall confining the first fluid, wherein the at least one reconfiguration reducer is located in the electrowetting element at a location along a join between the surface and the at least one wall, to determine a duration of switching the first and second fluids from the first configuration to a configuration of the first and second fluids with no voltage is applied.

15. An electrowetting element according to claim 1, including a display area of the surface for providing a display effect of the electrowetting element in dependence on an extent of adjoinment of the first and second fluids with the surface, the first fluid adjoining a first region of the display area and the second fluid adjoining a second region of the display area in the first configuration, the first region including the first area and the second region including the second area, the first region and the second region together forming the display area.

16. An electrowetting element according to claim 15, wherein an extent of the second region for the first configuration is different from an extent of the second region for the second configuration.

17. An electrowetting display device comprising:
at least one electrowetting element including a first fluid and a second fluid immiscible with the first fluid;
and a surface,
the first and second fluids being switchable to a first configuration by application of a voltage, the first fluid adjoining a first area of the surface and the second fluid adjoining a second area of the surface in the first configuration, the at least one electrowetting element including at least one reconfiguration reducer for reducing a reconfiguration of the first and second fluids from the first configuration to a second configuration, wherein the second configuration has the first fluid adjoining the second area and the second fluid adjoining the first area,
the electrowetting display device further comprising:
a configuration of electrodes for applying the voltage; and
a voltage controller configured to control the applying of the voltage to the configuration of electrodes.

18. An electrowetting display device according to claim 17, comprising a plurality of the electrowetting element, wherein the at least one reconfiguration reducer is located in one of the plurality of electrowetting elements in substantially the same location relative to the location of the at least one reconfiguration reducer of another of the plurality of electrowetting elements.

19. An electrowetting display device according to claim 17, wherein the at least one reconfiguration reducer is a barrier arranged to reduce a flow of the first fluid from one location on the surface to another location on the surface.

20. An electrowetting display device according to claim 19, including a wall at least partly confining the first fluid, wherein the barrier is arranged to reduce a flow of the first fluid along the wall from one location on the wall to another location on the wall.

21. An electrowetting display device according to claim 20, wherein the barrier is at least one of a protrusion of the wall, a protrusion of the surface, an indentation of the wall, or an indentation of the surface.

22. An electrowetting display device according to claim 17, including at least one wall confining the first fluid, the at least one reconfiguration reducer including a first reconfiguration reducer and a second reconfiguration reducer located on a join between the surface and the at least one wall, the first and second reconfiguration reducers substantially opposing each other.

23. An electrowetting display device according to claim 22, wherein the at least one walls includes a first wall and a second wall opposite the first wall, wherein the first reconfiguration reducer is located substantially half-way along a join between the surface and the first wall and the second reconfiguration reducer is located substantially half-way along a join between the surface and the second wall.

\* \* \* \* \*